US012779391B2

(12) United States Patent
Michel

(10) Patent No.: US 12,779,391 B2
(45) Date of Patent: Nov. 3, 2026

(54) CARBON DIOXIDE CAPTURE SYSTEM

(71) Applicant: INTERNATIONAL BUSINESS MACHINES CORPORATION, Armonk, NY (US)

(72) Inventor: Bruno Michel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 18/400,567

(22) Filed: Dec. 29, 2023

(65) Prior Publication Data

US 2025/0214025 A1 Jul. 3, 2025

(51) Int. Cl.

*B01D 53/14* (2006.01)
*B01D 53/04* (2006.01)
*F03G 6/00* (2006.01)

(52) U.S. Cl.

CPC ..... *B01D 53/1406* (2013.01); *B01D 53/0438* (2013.01); *B01D 53/0462* (2013.01); *B01D 53/1475* (2013.01); *F03G 6/071* (2021.08); *B01D 2257/402* (2013.01); *B01D 2257/504* (2013.01); *B01D 2257/7025* (2013.01); *B01D 2257/80* (2013.01); *B01D 2259/40098* (2013.01); *B01D 2259/804* (2013.01)

(58) Field of Classification Search

CPC ............ B01D 53/0407; B01D 53/0438; B01D 53/0446; B01D 53/0462; B01D 53/1406; B01D 53/1475; B01D 53/261; B01D 2253/102; B01D 2253/106; B01D 2253/108; B01D 2253/116; B01D 2253/202; B01D 2253/204; B01D 2253/25; B01D 2257/402; B01D 2257/404; B01D 2257/504; B01D 2257/025; B01D 2257/80; B01D 2258/06; B01D 2259/40098; B01D 2259/804; F03G 6/071

See application file for complete search history.

(56) References Cited

U.S. PATENT DOCUMENTS 9,266,057 B1 2/2016 Jones et al.
10,703,645 B2 7/2020 Shahriari et al.
(Continued)

FOREIGN PATENT DOCUMENTS

CN 209677010 U 11/2019
CN 115318061 A 11/2022
(Continued)

OTHER PUBLICATIONS

"Using 13X, LiX, and LiPdAgX zeolites for CO2 capture from post-combustion flue gas," https://pdf.sciencedirectassets.com/271429/1-s2.0-S0306261917X00020/1-s2.0-S0306261917300399/main.pdf?X-Amz-Security-Token=IQoJb3JpZ2luX2VjEJf%2F%2F%2F%2F%2F%2F% (Year: 2017).*
(Continued)

*Primary Examiner* — Jennifer Dieterle
*Assistant Examiner* — Phillip Y Shao
(74) *Attorney, Agent, or Firm* — CHIP LAW GROUP

(57) ABSTRACT

A solar updraft tower having elements for direct air capture of carbon dioxide. The solar updraft tower includes a chimney; a solar collector feeding into the chimney, and a contactor to an opening of the solar collector having a plurality of fins coated with a layer of sorbent material. The sorbent material absorbs carbon dioxide ($CO_2$) and water ($H_2O$).

20 Claims, 5 Drawing Sheets

(56) References Cited

U.S. PATENT DOCUMENTS

| | | | | |
|---|---|---|---|---|
| 2009/0126397 A1* | 5/2009 | Sueoka | F28F 1/32 62/515 |
| 2021/0023498 A1* | 1/2021 | Monereau | B01D 53/047 |
| 2023/0277976 A1 | 9/2023 | Lackner et al. | |

FOREIGN PATENT DOCUMENTS

| | | | | |
|---|---|---|---|---|
| CN | 122459069 A | 7/2026 | |
| EP | 4043720 A1 | 8/2022 | |
| WO | WO-2022186970 A1 * | 9/2022 | A01G 15/00 |
| WO | 2025/141333 A1 | 7/2025 | |

OTHER PUBLICATIONS

Esmaeili, F., Gholami, M., & Hojjat, M. (Aug. 27, 2019). Accelerated CO2 capture on adsorbent coated finned tube: An experimental study. Energy, 187, 116014.
International Search Report from PCT/IB2024/055639 dated Oct. 14, 2024. (14 pages).
Dwortzan, M. (Jun. 8, 2022) Affordable direct air capture: myth or reality? https://globalchange.mit.edu/media/affordable-direct-air-capture-myth-or-reality.
Direct Air Capture (Accessed on Nov. 13, 2023) https://www.iea.org/energy-system/carbon-capture-utilisation-and-storage/direct-air-capture.
Lebling, K., Leslie-Bole, H., Byrum, Z., Bridgwater, L. (May 2, 2022) 6 Things to Know About Direct Air Capture https://www.wri.org/insights/direct-air-capture-resource-considerations-and-costs-carbon-removal.
Ming, T., Caillol, S., & Liu, W. (Feb. 22, 2016). Fighting global warming by GHG removal: destroying CFCs and HCFCs in solar-wind power plant hybrids producing renewable energy with no-intermittency. International Journal of Greenhouse Gas Control, 49, 449-472.
Ming, T., Gui, H., Shi, T., Xiong, H., Wu, Y., Shao, Y., . . . & de Richter, R. (Sep. 15, 2021). Solar chimney power plant integrated with a photocatalytic reactor to remove atmospheric methane: A numerical analysis. Solar Energy, 226, 101-111.
"Advancing integrated science. Informing decision-makers. Addressing global change", MIT—Center for Sustainability Science and Strategy, Oct. 15, 2025, 02 pages.
"Can we correct the genetic mutations that cause diseases?", Genetics, Oct. 15, 2025, 05 pages.
"Driving clean energy innovation", MIT Energy Initiative, Oct. 15, 2025, 02 pages.
"Ideas Made to Matter How to boost your organization's AI maturity level", Sloan School of Management, Oct. 15, 2025, 02 pages.
"Sixth Assessment Report", Oct. 15, 2025, 03 pages.
"We believe humanity can Create a low-carbon future", Carbon Engineering, Oct. 15, 2025, 03 pages.
"We look ahead by looking up", Aeroastro, Oct. 15, 2025, 12 pages.
"We're developing and commercializing exciting, first-of-their-kind technologies, projects and businesses", Oxy, Oct. 15, 2025, 02 pages, https://www.oxy.com/operations/carbon-innovation/project-ventures/.
"What are "negative emissions"?", Myclimate—Shape our future, Oct. 28, 2024, 02 pages.
Chaikittislip et al., "Poly(l-lysine) Brush-Mesoporous Silica Hybrid Material as a BiomoleculeBased Adsorbent for CO2 Capture from Simulated Flue Gas and Air", Chemistry: A European Journal (John Wiley & Sons, Ltd)—vol. 17, Issue: 38, Aug. 16, 2011, 06 pages.
MIT Laboratory for Aviation and the Environment, Oct. 15, 2025, 01 page.

* cited by examiner

CARBON DIOXIDE CAPTURE SYSTEM

BACKGROUND

The present invention generally relates to carbon capture, and more particularly to direct air capture (DAC) of carbon dioxide ($CO_2$).

Progress in direct air capture (DAC) has made large-scale deployments of direct air capture (DAC) by adsorption is technically feasible. The synergy between direct air capture (DAC) and carbon capture technologies for point sources can help in mitigating climate change effects in the long-term. The obstacles for direct air capture (DAC) systems can include land use, cost, and energy consumption, as well as difficulty in choosing appropriate materials for capture.

The other problem is that the resulting product from running a direct air capture (DAC) system is carbon dioxide ($CO_2$), which only provides an indirect value.

An additional benefit results when not only gaseous carbon dioxide ($CO_2$) is captured, but also water is captured. Water is 20× more abundant than $CO_2$ even in dry hot air, e.g., a relative humidity of 10% at 40° C. Desalination has a high energy consumption and requires water transport over hundreds of kilometers, as well as lifting to higher altitudes when performed at the coast.

Direct air capture (DAC) consumes 5× more exergy than capture from spot sources due to 1) higher regeneration temperature or two stage process needed to get the concentration factor and 2) electrical energy for air movers to get sufficient air to pass the adsorber modules. For this reason, direct air capture (DAC) is done at locations with surplus energy available, e.g., with geothermal energy. A problem with geothermal energy is that the surfaced water includes a high concentration $CO_2$ dissolved which is then emitted. From a sustainability perspective, it does not make sense to access more energy and to create more global warming for the necessary negative emission scenario.

The solar updraft tower (SUT) or solar chimney generates electricity from low temperature solar heat beneath a very wide greenhouse-like roofed collector structure surrounding the central base of a tall chimney tower. The resulting convection causes a hot air updraft by the "chimney effect" that drives wind turbines to produce electricity. Scaled-up versions could generate significant power with sufficient efficiency and allow water extraction. The reason for the lack of scale-ups is the large initial capital expenditure (CAPEX) and the lack competitiveness of solar updraft towers (SUTs) with other renewable power sources. The high investment cost compared to the plant efficiency and the limited height of the chimney due to the technological constraints are the main disadvantages.

Current technologies like thermal swing adsorption, liquid sorption and solid sorption require large amounts of energy to move sufficiently large amounts of gas through the sorption device. This triggers an excessive amount of energy demand. The reason for the requirement of a large amount of energy in the thermal swing adsorption systems is the high pressure drop created by the packed bed of sorption material. The packed bed includes the small voids between the particles that can restrict airflow.

SUMMARY

In accordance with an embodiment of the present invention, a sloped solar updraft tower and power plant (SSUPP) is provided that produces renewable energy and runs a process with co-adsorption of carbon dioxide ($CO_2$) and water ($H_2O$). The direct air capture (DAC) system does not only provide an indirect value from the captured carbon dioxide ($CO_2$). The installations described herein provide water and energy in addition to carbon capture. A combination of three outputs are possible with a sloped solar updraft tower (SSUT). This system employs directed airflows to run wind turbines in the tower or at the air inlets to the glass covered collector. These airflows are suitable for "free" capturing in adsorbers at the air inlets with a very low pressure drop. Sloped solar updraft power plants (SSUPP) massively reduce SUT disadvantages and can make use of sloped areas not accessible for agriculture. Sloped solar updraft towers (SSUTs) can make use of appropriately oriented slopes to improve the efficiency of the technology. For example, SSUTs provide a higher altitude difference and better solar incidence angle when compared to non-sloped designs. Further, the SSUT can also provide a self-cleaning sloped glass surface, and can be constructed in regions not suitable for agriculture.

The water content of air is considerable even for very dry air as it is frequently found in the sunbelt. For 40° C. air, the water content is 62.5 g/m$^3$ at 100% 1.225 kg/m$^3$, which is equal to 5.1%. At 10% relative humidity, this is 0.51% compared to the carbon dioxide ($CO_2$) content of 0.042% or 420 ppm. These calculations illustrate that a sloped updraft tower can provide through capture more than 10 times as much water ($H_2O$) as carbon dioxide ($CO_2$).

Water capture is advantageous is desert environments. For example, Saudi Arabia has many suitable south facing slopes with a height difference larger than 1,000 meters for sloped solar updraft installations. The locations are also ideal in the sense that they can provide water in central locations with no need of pumping water over hundreds of kilometers uphill. This is only one example of a location having a geography with features suitable for sloped solar updraft tower and power plant (SSUPP) structures.

Sloped solar updraft tower and power plant (SSUPP) structures can be useful for efficiency reasons, because they provide elevation differences between inlet and outlet that can be larger than 1,000 meters, which can be difficult with free standing solar towers. Technologically, mounting a tower having a height ranging from 200 meters to 300 meters at the top of a 1000 meter slope/hill is better to provide the required greater than 1000 meter height difference than other designs not taking advantage of sloped surfaces. A second reason why sloped solar updraft tower and power plant (SSUPP) structures have advantages over other designs is that a south-facing slope (for northern hemisphere) is the better solar incidence angle which results in ~1.5× increase solar power density. A third reason is the self-cleaning ability of a sloped glass covered collector.

In an embodiment, a solar updraft system is provided that includes a chimney and a solar collector feeding into the chimney. The solar updraft system can also include a contactor to an opening of the solar collector having a plurality of fins including sorbent material. The sorbent material absorbs carbon dioxide ($CO_2$) and water ($H_2O$). In some embodiments, the contactor of the solar updraft system is a component of a two-stage system for adsorbing the carbon dioxide ($CO_2$) and the water ($H_2O$). In an embodiment, the first stage includes the contactor, and the second stage includes a rapid temperature swing adsorption (RTSA) spot source capture system. In an embodiment, a gasometer is present between the contactor of the first stage and the rapid temperature swing adsorption (RTSA) spot source capture system of the second stage. The solar updraft system can provide carbon dioxide ($CO_2$) and water ($H_2O$) without an external energy input.

In an embodiment, the contactor can provide for direct air capture (DAC) of carbon dioxide. In an embodiment, the contactor includes a channel housing a plurality of aluminum fins on copper tubes, wherein at least the aluminum fins are coated with a layer of a sorbent material. In one example, the sorbent material includes a porous structure selective towards carbon dioxide ($CO_2$). The sorbent material may have amine surface functionalization.

The solar updraft system can further include aerosol injection of aerosol into the chimney and creating a rotating hot airflow that is stable enough to rise to a high altitude, e.g., the stratosphere.

In another embodiment, a solar updraft system is provided that can include a chimney, a solar collector feeding into the chimney, and a two-stage system for absorbing carbon dioxide ($CO_2$) and water ($H_2O$) at an opening to the solar collector. The first stage of the two-stage system may include a contactor of fins having a sorbent material for adsorbing carbon dioxide. The second stage of the two-stage system may include a rapid temperature swing adsorption (RTSA) spot source capture system. In one example, a gasometer is present between the contactor of the first stage and the rapid temperature swing adsorption (RTSA) spot source capture system of the second stage. The solar updraft system can provide that the carbon dioxide ($CO_2$) and water ($H_2O$) be captured without external energy input. The two-stage system has the advantages of providing increasing carbon capture concentrations from the first stage to the second stage.

In one example, the solar updraft system is a sloped solar updraft system.

In one example, the contactor of the solar updraft system includes a channel housing a plurality of aluminum fins on copper tubes. In some examples, at least the aluminum fins are coated with a layer of a sorbent material. The contactor can provide for direct air capture (DAC) of carbon dioxide. In one example, the sorbent material includes a porous structure selective towards carbon dioxide ($CO_2$). In some examples, the sorbent material can be functionalized with amines.

In some embodiments, the solar updraft system can further include (near) stratospheric aerosol injection of sulfur-based aerosol into the chimney.

In another embodiment, a sloped solar updraft system is provided that includes a chimney, and a solar collector feeding into the chimney. The solar collector is built into a geographic feature. The geographic feature may be a hillside. By building the solar collector into the hillside, the natural height of the hillside can contribute to the overall height of the chimney. This can reduce construction costs. Further, the angle of the south-facing hillside (for northern hemisphere) can provide a natural chimney effect. The sloped solar updraft system can also include a two-stage system for absorbing carbon dioxide ($CO_2$) and water ($H_2O$) at an opening to the solar collector. The first stage of the two-stage system includes a contactor of fins having a sorbent material for adsorbing carbon dioxide ($CO_2$). The second stage of the two-stage system including a rapid temperature swing adsorption (RTSA) spot source capture system. In one example, a gasometer is present between the contactor of the first stage and the rapid temperature swing adsorption (RTSA) spot source capture system of the second stage. The sloped solar updraft system can provide that the carbon dioxide ($CO_2$) and water ($H_2O$) be captured without external energy input.

The contactor of the sloped solar updraft system can provide for direct air capture (DAC) of carbon dioxide ($CO_2$). In one example, the contactor of the sloped solar updraft system includes a channel housing a plurality of aluminum fins on copper tubes. In some examples, at least the aluminum fins are coated with a layer of a sorbent material. In one example, the sorbent material includes a porous structure selective towards carbon dioxide ($CO_2$).

In some embodiments, the solar updraft system can further include stratospheric aerosol injection of sulfur-based aerosol into the chimney.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
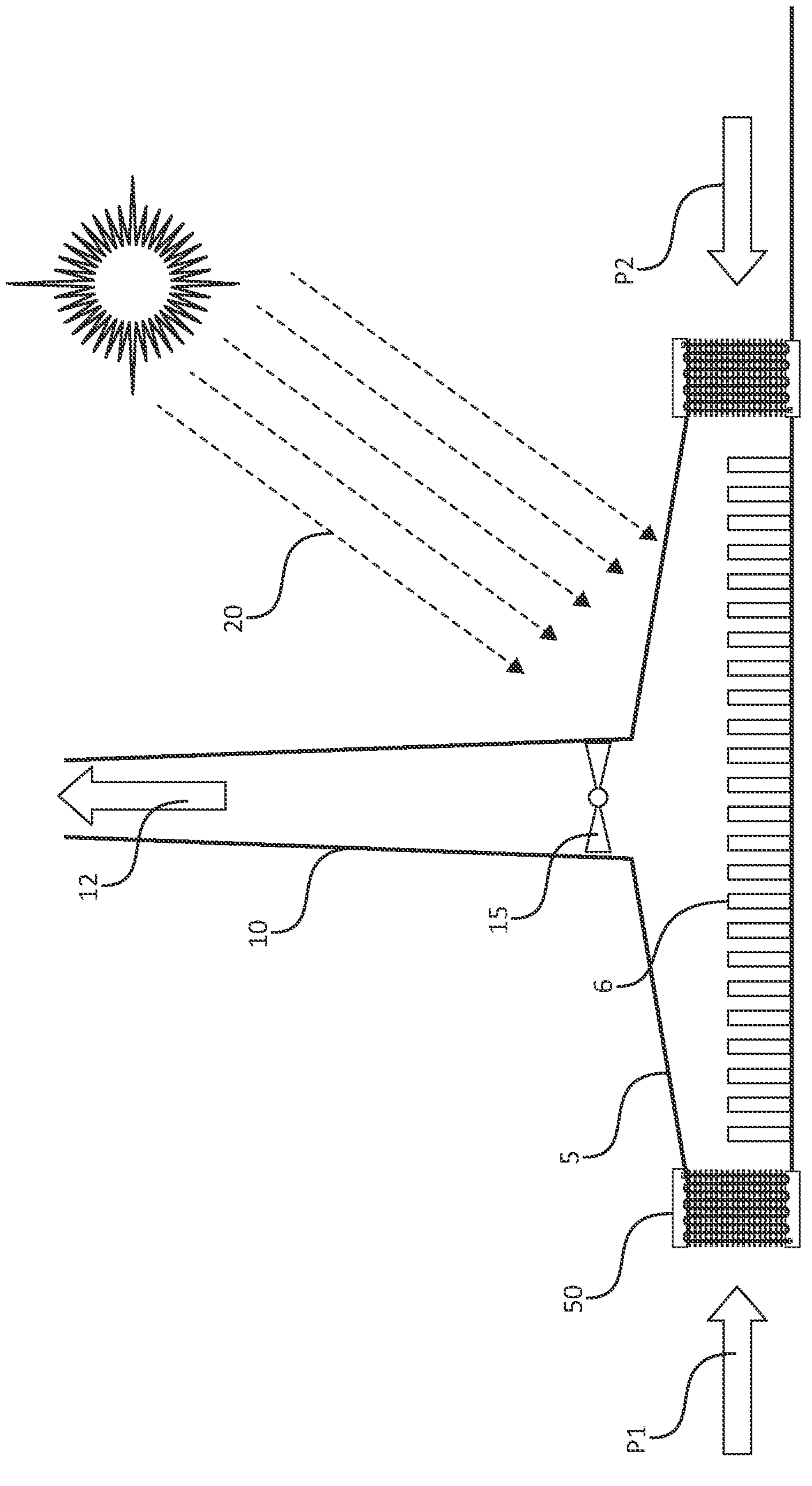
FIG. 1 is an illustration depicting a side cross-sectional view of a direct air capture system, in accordance with an embodiment of the present invention.

In accordance with an embodiment of the present disclosure, a system of direct carbon dioxide ($CO_2$) air capture is described here that can mitigate climate change. Greater amounts of negative carbon dioxide ($CO_2$) emissions than previously expected are required to compensate for the asymmetric climate-carbon cycle.

Most integrated assessment models prefer bioenergy with carbon capture and storage (BECCS) and afforestation to achieve negative emissions due to their low costs and ability to generate energy. However, the water and land-use costs are large with these systems. In contrast, direct air capture (DAC) occupies much less land (1 hectare (ha) per ton $CO_2$ captured per day) and requires less water. Thus, direct air capture (DAC) has a higher sequestration efficiency than bioenergy with carbon capture and storage (BECCS) due to substantially smaller land use. However, solar updraft towers can occupy more land than direct air capture (DAC), but provide additional energy and water capture.

In some examples, solar updraft tower (SUT) power plants can use four components: a collector cover, an absorber plate, a solar chimney or tower, and an energy processing unit (EPU) for power generation. The energy processing unit (EPU) can include a turbine coupled with a generator to harness energy from the airflow. The solar energy is transmitted into the canopy through the collecting cover made from soda lime glass, transparent glass, perspex sheet, plastic transparent sheets, or PVC/PVF. In some examples, the material for the cover may have a transmittance ranging from 0.84 to 0.91 for a 5 mm thickness.

The absorber plate stores the solar energy and can be made from a metal. The metal for the absorber plate can be selected from aluminum, iron sheets corrugated zinc sheets, copper platex, steel and combinations thereof. The heat capacity and thermal conductivity of materials are important when considering the composition of the material for the absorber plates. For example, aluminum with a heat capacity of 2.368×106 J/m3K and a thermal conductivity of 202.4 W/mK. These characteristics are suitable for use as a fin material for a contactor. The absorber plate can also be coated in black color so it can absorb more heat. Hierarchical material combinations with aluminum (Al) fins and a less conductive more economical material like clay or water can improve the overall performance. The SUT plant performance depends upon the pressure difference created by the upward moving buoyant airflow in the chimney.

Sloped Solar Updraft Power Plant (SSUPP) can reduce the disadvantages of solar updraft towers (SUT), and can make use of sloped areas that are not accessible for agriculture. A solar chimney collector system on a sloped surface or suitable hill has two major advantages over a free-standing chimney: 1) if the collector slope is optimized, the solar radiation received is improved and 2) a sloped surface constitutes a natural chimney. Therefore, the chimney height above the collector height may be reduced, reducing cost.

In some embodiments, successful implementation of a direct air capture (DAC) approach requires a combination of at least some of the following elements: (1) a contactor to capture $CO_2$ and $H_2O$ from air and to regenerate the material using solar thermal energy and a thermal swing process; (2) material formulation as layer on metal heat exchangers (HEX) fins with hierarchical structuring using magnetically aligned pores; (3) sloped updraft tower technology design that combines $CO_2$/$H_2O$ extraction with energy generation; and (4) the use of updraft to inject aerosols into the stratosphere to modulate insolation and cloud reflectivity.

Referring now to the drawings in which like numerals represent the same or similar elements and initially to FIG. 1, an embodiment of a solar updraft power plant (SUPP) is depicted that includes three main components: circular solar collector 5, chimney 10, and the turbine 15. The circular solar collector 5 is feeding into the chimney 10. The circular solar collector 5 is erected above the ground with a certain gap between the canopy and the soil. The chimney 10 is constructed in the middle of the circular solar collector 5 and last component is the turbine 15. The turbine 15 is installed at the lower part of the chimney 10. The SUPP physical operating principle is very simple. Solar radiation 20 heats air underneath the canopy by means of greenhouse effect. When air gets hot, the density will be reduced, and the air will be driven naturally up to the chimney outlet 12 under the natural buoyancy effect. This generates an updraft air velocity in the chimney 10 that operates the turbine 15, which is located at the base of the chimney 10, to generate electricity. New air will enter the system through the periphery P1, P2 of the circular solar collector 5 and it will be heated, and the process will continue.

The gas flow P1, P2 is introduced at ambient temperature, e.g., 25° C. to 35° C., and is heated under the disk provided by the circular solar collector 5, which may be a glass disk. The gas flow may be at a rate of 15 m/s. The tower may also include thermal storage pillars 6 that also store heat during the day to keep the updraft and power fully active at night. For example, during the day adsorption may be at a temperature ranging from 25° C. to 35° C., whereas during the night the temperature can drop and may cause adsorption to be performed in temperatures ranging 5° C. to 10° C. In some embodiments, the thermal storage pillars also include catalytic surfaces to convert traces of methane ($CH_4$) and nitrous oxide ($N_2O$) to carbon dioxide ($CO_2$), water ($H_2O$), and nitrogen with ultraviolet (UV) treatments.

Additionally, regenerative energy can be collected by solar panels integrated into the surfaces of the design that face the sun.

Figure 2:
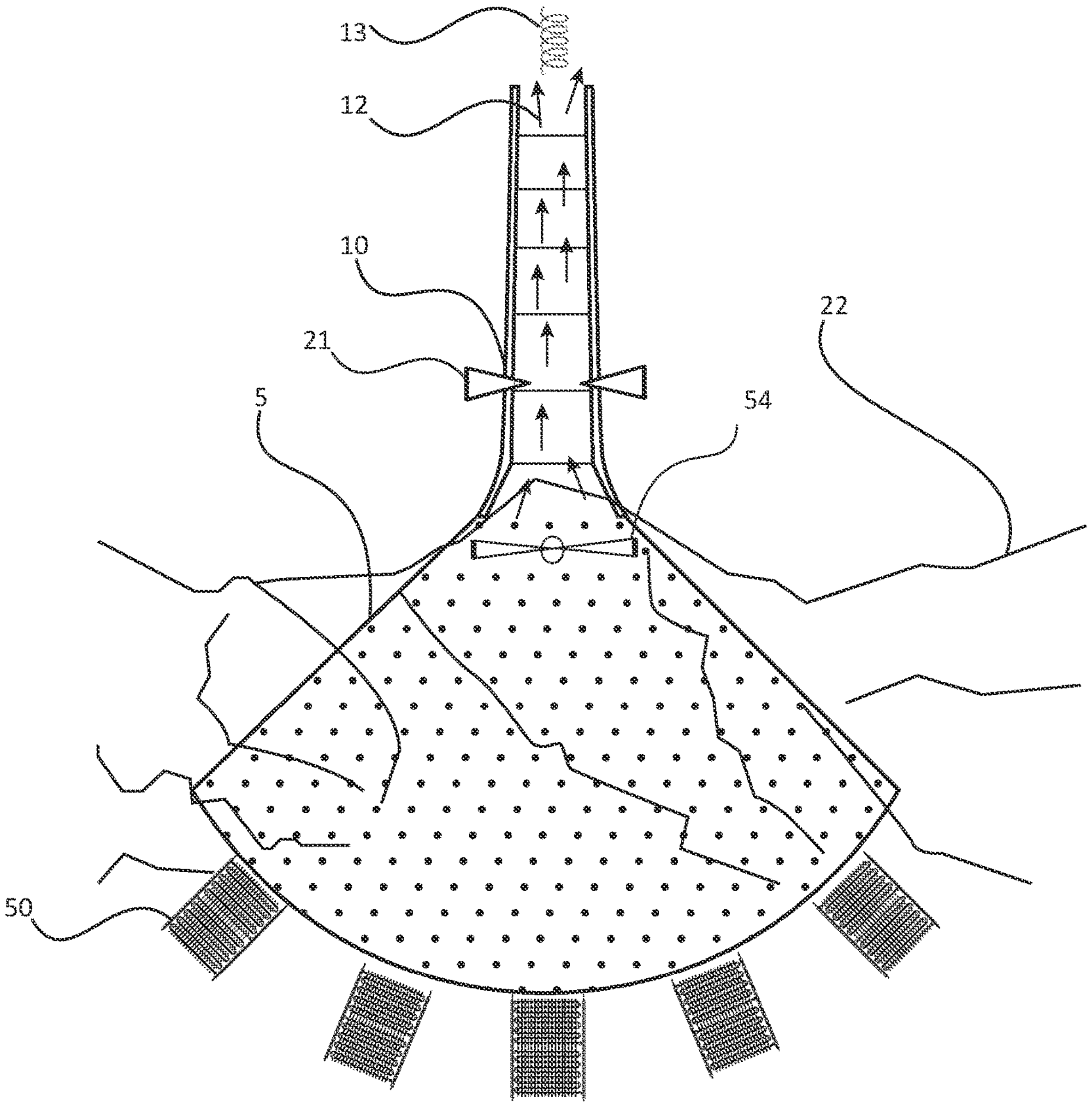
FIG. 2 is an illustration depicting a side cross-sectional view of a sloped solar updraft tower, in accordance with an embodiment of the present invention.

FIG. 2 illustrates an embodiment of a slopped solar updraft power plant (SUPP). Designing solar chimney collector system to be built on a sloped geographic feature, such as sloped surface or suitable hills has two major advantages. First, if the collector slope is optimized, the solar radiation received by the collector system may be improved to a satisfactory level for a year round operation. Second, a sloped surface constitutes a natural chimney, therefore the chimney height standing above the collector height may be reduced considerably, thus reducing civil engineering problems and cost.

The sloped solar updraft towers (SSUTs) includes a sloped solar collector that has a triangular surface area with a chimney 10 at its apex. The solar collector sides are closed, and the air enters the lower side and rises as heated by ground to the apex where a short chimney is installed vertically. At the chimney base, or at ground level inlets turbines are installed to generate electricity. For a slopped solar updraft power plant (SUPP) design the solar chimney collector system on sloped surface 22 or suitable hills has some advantages. For example, if the collector slope is optimized, the solar radiation received by the collector 5 may be improved to a satisfactory level for a year-round operation. Further, a sloped surface naturally constitutes a chimney 10, therefore the chimney height standing above the collector height may be reduced considerably, thus reducing civil engineering problems and cost.

FIG. 2 also illustrates spray nozzles 21 for aerosol injection into the chimney 10, wherein the injection of aerosol produces an airflow plume to reach the stratosphere. FIG. 2 illustrates a rotating airflow 13 exiting the chimney 10. FIG. 2 also illustrates an impeller 54 at the base of the chimney 10. In another embodiment, an impeller 54 is integrated with each contactor 50.

Referring to FIGS. 1 and 2, a contactor 50 is employed to capture carbon dioxide ($CO_2$) and water ($H_2O$). In some embodiments, the contactor 50 allows air to pass with almost no pressure drop, while ensuring that it interacts with the porous sorbent for a sufficiently long time. This can provide that the air that passes the contactor 50 gets re-mixed so that a high capture yield greater than 80% is accomplished. In some embodiments, higher yields greater than 90% may be possible, but can interfere with the amount of power produced.

Figure 3:
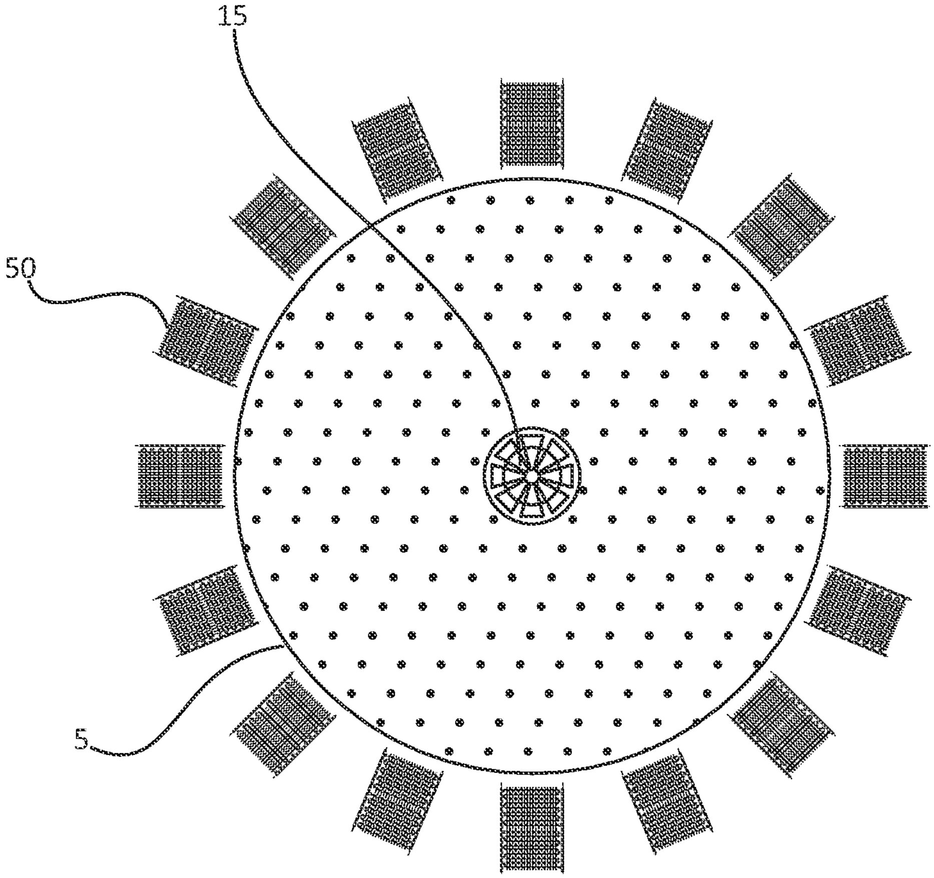
FIG. 3 is a top down view of a tower in a solar updraft tower, in accordance with an embodiment of the present invention.

The placement of the contactors 50 relative the collector 5, the turbine 15 and chimney 10 is further depicted in FIG. 3. FIG. 3 is a top down view illustrating contactors 50 positioned around a perimeter of the collector 5. In the example, depicted in FIG. 3, there are sixteen contactors 50 dispersed uniformly around the perimeter of the circular solar collector 5.

Figure 4:
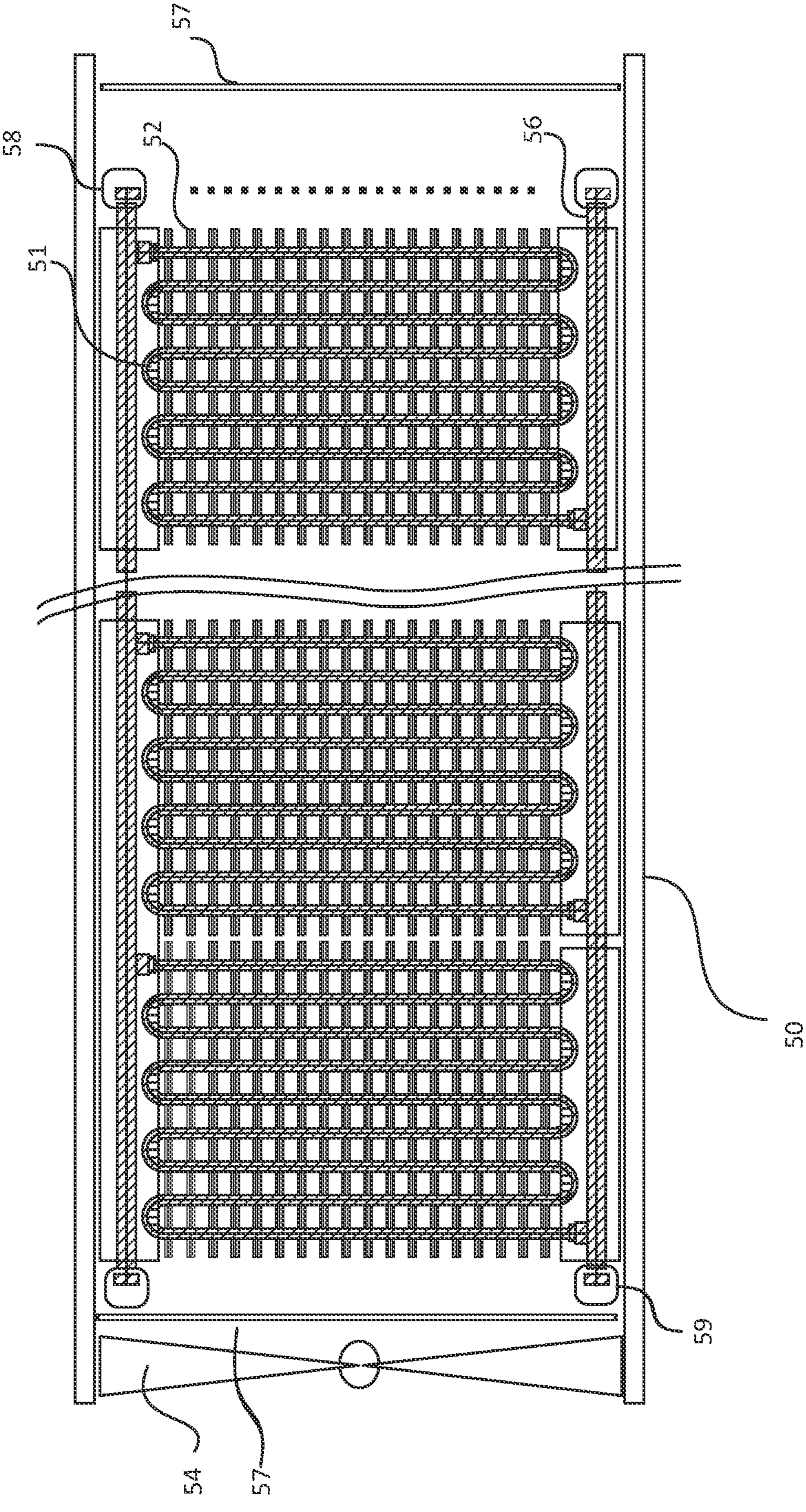
FIG. 4 is a side view of a contactor for direct air capture with a solar updraft tower, in accordance with an embodiment of the present invention.

Referring to FIG. 4, in some examples, a contactor 50 with low pressure drop performance includes tubes 51, e.g., tubes composed of copper, and fins 52, e.g., fins composed of aluminum. In some embodiments, the fins 52 are coated with layers of sorbent material. The fins 52 may each have a thickness that ranges from 0.15 mm to 2 mm. The adjacent fins 52 may be spaced apart at a distance of 3 mm to 10 mm. In some embodiments, the layers of sorbent material present on the fins 52 are created by dip coating or 3D printing of the fins with slurries of powders of the material formulated with binder. In some embodiments, the size of the contactor 50 may have the dimensions of 5 meters×5 meters×15 meters.

In some embodiments, the sorbent material that is present on the fins 52 of the contactor 50 may be a porous material. This same sorbent material may also be used in a rapid temperature swing adsorption (RTSA) spot source capture system 80 that is employed in a two stage system with the contactor 50. Porous sorbents can include, but are not limited to, metal-organic frameworks (MOFs), zeolites, activated carbon, silica materials, carbon nanotubes, porous organic polymers, and carbon molecular sieves. Internal (thermal and mass transport) resistance includes internal diffusion at the micro, meso-, and macro-pore level and dominates the overall kinetics.

In some embodiments, the deposition process for forming the sorbent material may be optimized for increased adsorption of carbon dioxide ($CO_2$) and water ($H_2O$). In some embodiments, mass and thermal transport for a large amount of sorbent is improved to allow the active to dead mass ratio becomes large. This enhances, e.g., increases, the energy efficiency of the system during regeneration. In some embodiments, the adsorption and desorption kinetics for the contactors 50 are improved using a magnetic alignment process (in a magnetic field) with ionic fluid in 1 micrometer (μm) vesicles during application of the sorbent material to the aluminum fins 52. The pores in the sorbent material may be aligned to create pores vertically aligned to the plane defined by the length of the aluminum fins 52. In one example, a sloped solar updraft power plant (SUPP) for 340 tons per day (TPD) carbon dioxide ($CO_2$) can use between 100-150 contactors 50.

Figure 5:
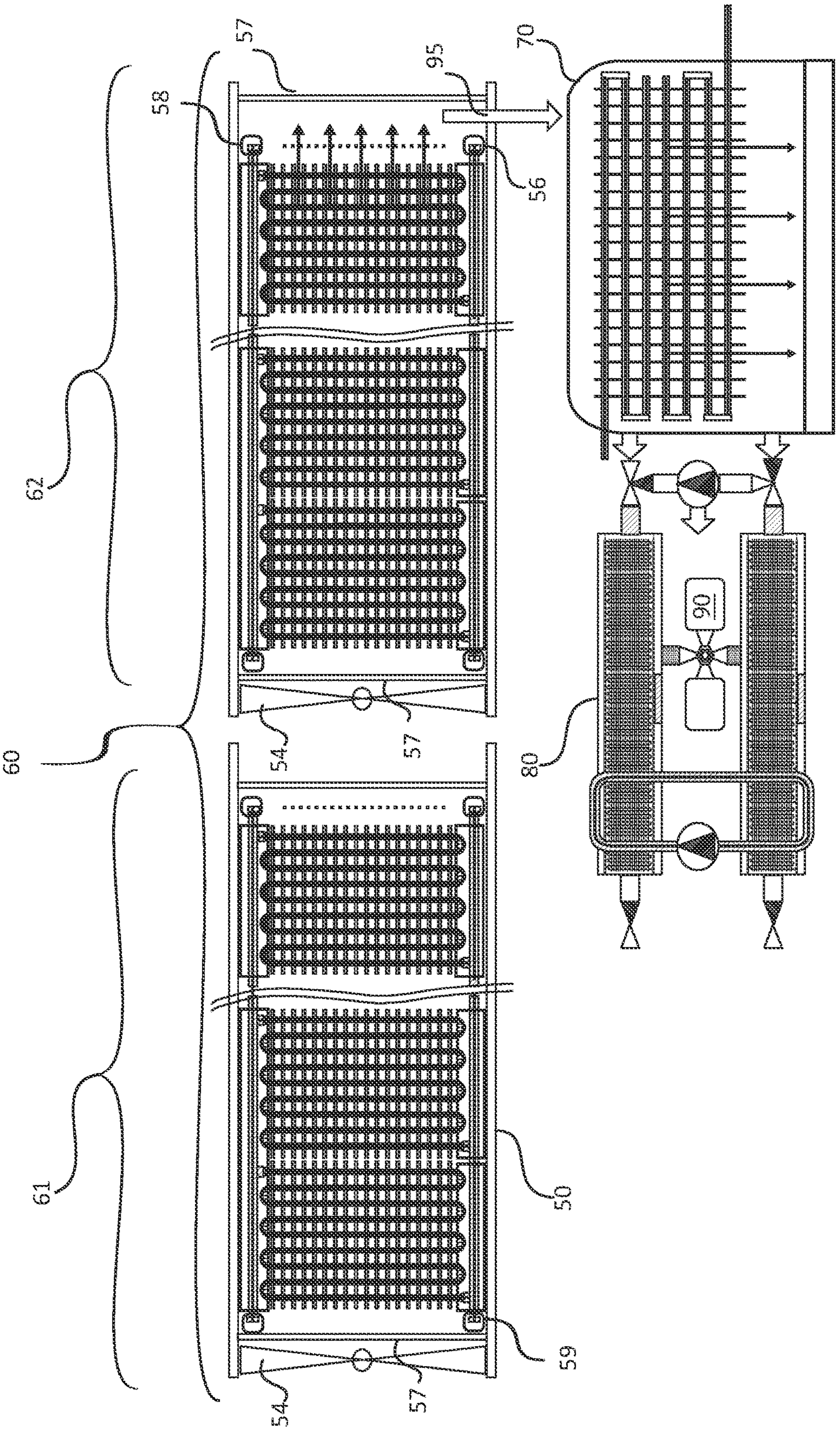
FIG. 5 is a side view of a two-stage assembly including contactors for adsorbing carbon dioxide and water using a solar updraft tower; in accordance with an embodiment of the present disclosure.

The contactor 50 may be part of a two-stage system, as depicted in FIG. 5. The first stage 60 may include contactors 50 and produces (50×) 400 ppm adsorbed carbon dioxide ($CO_2$). The condensation of water increases the carbon concentration ($CO_2$) concentration two to five times. The water may be captured in a gasometer 70. The second stage may include the rapid temperature swing adsorption (RTSA) spot source capture system 80. In some embodiments, water ($H_2O$) is further condensed in the rapid temperature swing adsorption (RTSA) spot source capture system 80, and a carbon dioxide ($CO_2$) rich mixture is further concentrated in the rapid temperature swing adsorption (RTSA) spot source capture system 80.

The rapid temperature swing adsorption (RTSA) spot source capture system 80 can increase the carbon dioxide concentration to 100%. Rapid temperature swing adsorption (RTSA) spot source capture system 80 employs a controlled fast temperature jump. The sorption material is mounted as a layers with varying thickness onto aluminum fins that are temperature controlled by means of fluid flowing through the copper tubes of the heat exchangers. In some embodiments, the rapid temperature swing adsorption (RTSA) spot source capture system 80 includes a valve 90 to control the fluid switching system to provide that the fluid be cycled between a hot condenser and a cold condenser of the rapid temperature swing adsorption (RTSA) spot source capture system 80.

Still referring to FIG. 5, in some embodiments, a second rapid temperature swing adsorption (RTSA) spot source capture system may also be employed to specifically concentrate trace greenhouse gasses, such as methane ($CH_4$) and nitrous oxide ($N_2O$). The second adsorption (RTSA) spot source capture system may also capture nitrogen ($N_2$) and oxygen ($O_2$).

The system illustrated in FIGS. 1-4 may have an updraft system that deviates from the designs that have only been optimized for electrical energy production that do not adsorb water. The deviations are due to the design of controlled inlets, e.g., the contactors 50, that can remove both carbon dioxide ($CO_2$) and water ($H_2O$). In prior systems, a larger temperature gradient is required for the system to function than the systems described herein, because the water content affects the air density. The difference in air density due to the absence of water vapor in prior designs results in requiring a larger temperature gradient to create the same uplift performance.

The system depicted in FIGS. 1-4 can be configured with two stages. For example, the best efficiency can employ a two-stage system with purification ratio of 0.04 to 2% followed by a purification from 2 to 100%, as illustrated in FIG. 5. In some examples, the first stage 60 provides ~2% $CO_2$ and 5-50% $H_2O$ as an output which is stored in a gasometer 70 (may also be referred to as a condenser in some scenarios) where water condenses to a level greater than 2% such that the carbon dioxide ($CO_2$) can be purified in the second stage at a rapid temperature swing adsorption (RTSA) spot source capture system 80. In the second stage, e.g., the rapid temperature swing adsorption (RTSA) spot source capture system 80, the carbon dioxide ($CO_2$) can be purified to 100% while providing additional water. In one example, a 1 kilometer squared system provides 340 tons per day (TPD) $CO_2$ and 10000 ton pers day (TPD) (m3/day) water ($H_2O$). The total amount of desalinated water may be equal to 1.9 bio $m^3$/yr=5 mio $m^3$/day.

Referring to FIG. 4, in an embodiment, the contactor 50 supports optimized mass and thermal transport triggered by employing hierarchical structuring, and optimally uses the energy available in the form of a pressure difference to create a maximal flow and hot fluid for regeneration. The contactor 50 may include a plurality of fins 52 present on tubing 41. The fins 52 are composed of aluminum and may be coated with a sorbent material. Manifolds 56 provide an inlet 58 for fluid to cool during adsorption at temperatures ranging from 20° C. to 40° C., and to drive regeneration/desorption at temperatures ranging from 100° C. to 130° C. The manifold 56 also includes an outlet 59 for returning fluid to a cooling tower during adsorption, or for sending fluid to thermal collectors during desorption. The contactor 50 also includes valves 57. The valves 57 close the inlet 58 and the outlet 59 during regeneration.

In some embodiments, the contactor 50 is responsible for the first capture/purification step that increases the carbon dioxide ($CO_2$) content to a value within a range of 0.5% to 2%, and the water ($H_2O$) content to greater than 50%.

The gas is directed into a gasometer 70 with integrated cooling elements that triggers the condensation of the water while increasing the carbon dioxide ($CO_2$) concentration to 0.5-10%. A gas concentrate can be directed to the gasometer 70. A gasometer 70 is device used to buffer the gas being desorbed as a pulse from the contactors 50 and reduce the temperature while condensing the water from gas to fluid. The carbon dioxide ($CO_2$) that can be produced at this stage of the system can be used for enhanced oil recovery (EOR). This carbon dioxide ($CO_2$) can be used for enhanced oil recovery (EOR) applications when dissolved under elevated pressure in water. The carbon dioxide ($CO_2$) from this stage can also be provided as an input of a rapid temperature swing adsorption (RTSA) concentration system, as illustrated in FIG. 5.

FIG. 5 illustrates the contactor 50 in two modes of operation. The first mode of operation 61 may be conducted at a lower temperature than the second mode of operation 62. For the first mode of operation 61, the contactor 50 is depicted in the adsorbing mode with air passing through the main opening towards the impeller 54 that is extracting energy from the air flow. The energy produced by turning the impeller 54 is sufficient to run the system itself, and can produce surplus energy for third party users. In the first mode of operation 61, cooled water, e.g., having a temperature ranging from 10° C. to 30° C., is flow through the manifold 56 and the tubes 51. The manifold 56 may be connected to a 6 way valve. In one position of the valve 57, cooling tower water provide cool water to the first stage 60 operating in the first mode of operation 61.

FIG. 5 also illustrates the second mode of operation 62. The second mode of operation 62 is called a regeneration mode, which may also be referred to as a desorbing mode. For operations in the second mode of operation 62, the valves 57 on the left side and right side (inlet and outlet) are closed while hot water, e.g., having a temperature ranging from 90° C.-150° C., flows through the manifold, e.g., the tubes 51 of copper, triggering desorption of the previously adsorbed carbon dioxide ($CO_2$) and water ($H_2O$). The hot water may be provided by solar heated panels or solar heated water that is stored in a hot water tank. The previously adsorbed carbon dioxide ($CO_2$) and water ($H_2O$) are pushed towards the right side (towards tube 95) of the contactor 50 depicted in FIG. 5, wherein the pipe is opened toward the gasometer 70. The valves 57 may be controlled by a switch to cycle the two stage system between the first mode of operation 61 and the second modes of operation 62.

In some embodiments, the contactor 50 is a channel filled with a coated Al-fin-copper-tube heat exchanger. More particularly, the channel housing has the dimensions of being 5 meters by 5 meters by 15 meters. The dimensions for the channel housing are selected for providing airflow that is both sufficient for capturing carbon ($CO_2$) and providing an updraft having sufficient to extract energy via the turbine 15. In one example, the dimensions for the channel housing may be 1 meter×1 meter×3 meters. The heat exchanger includes tubes 51 of copper in combination with fins 52, e.g., aluminum fins. The fins 52 have a spacing of 3 mm to 10 mm and coating thickness is 0.5-2 mm. Other dimensions have been considered for the fins 52. However, if the spacing is too small a pressure drop can occur that will impact the generation of the updraft. A strong updraft provides sufficient force to turn the turbine for energy extraction. Additionally, if the spacing is too great carbon capture may be substantially reduced. In some embodiments, the spacing separating adjacent fins may range from 5 mm to 10 mm. The previously described configuration allows operation with a fast flow (1-3 m/s) and a dwell time of 5-15 seconds. Capturing is done between 9 am during the day and overnight until 6 am next day with ambient temperatures in the range of 10° C. to 40° C. The advantage is that with a continued capture process with cooler night temperatures the capacity is increased. The regeneration is driven by solar thermal collectors that face eastwards to capture the morning sun from 6 am to 9 am (or during cloudy days from a thermal storage tank). The temperature level for regeneration is 90-120° C.

Referring to FIGS. 4 and 5, in some embodiments, the contactor 50 can also integrate a impeller 54 that generates energy and regulates the flow of air through the contactor 50. For regeneration, two valves 57 close the ends of the contactor 50 allowing the extracted carbon dioxide ($CO_2$) and water ($H_2O$) to be channeled to the gasometers 70 via a tube 95 and valve 57 that is now open.

In some embodiments, the solid sorbent material of the contactor 50 has been optimized for mass and thermal transport. For example, the solid sorbent material is deposited on the heat exchanger (HEX) of the contactor 50, e.g., deposited on the fins 52 the heat exchanger including having an aluminum composition and/or tubes 51 of a copper, using a method that employs magnetic fields to form magnetically aligned pores that improve mass transport. In addition, the solid sorbent material that is deposited on the fins 52 of the heat exchanger further include necking by ferroelectric nanoparticles that are used to improve thermal transport.

In some embodiments, the aligned pores are created by mixing regular sized vesicles filled with ferroelectric fluid into the slurry. The slurry is then dried within a magnetic field with the field lines aligned perpendicular to the plane of the fins 52, e.g., fins of aluminum (Al). The film is baked in an oven where the vesicles rupture. The ferroelectric nano particles assemble at contact points of the adsorbent particles creating necks that improve the thermal conductivity. When the vesicles burst during drying and "baking" of the sorbent the ferroelectric material is pulled by capillary forces to the contact points of the sorbent crystallites/particles.

In solid sorbents, carbon dioxide ($CO_2$) interacts with hierarchically porous materials via weak intramolecular forces called physisorption or strong covalent bonding called chemisorption. The bond strength to the surface is proportional to the heat of adsorption which is less than 15 kcal $mol^{-1}$ for physisorption and larger than this threshold for chemisorption with exceptions for a few zeolites.

Solid sorbents can be made more selective towards carbon dioxide ($CO_2$). Porous sorbents suitable for use with the contactors 50 can be metal-organic frameworks (MOFs), zeolites, activated carbon, silica materials, carbon nanotubes, porous organic polymers, and carbon molecular sieves. Internal (thermal and mass transport) resistance includes internal diffusion at the micro-pore level, meso-pore level, and macro-pore level and dominates the overall kinetics. The micropores and mesopores experience surface and capillary forces with carbon dioxide ($CO_2$) molecules. Gas flow in macropores and around particles is explained including Knudsen diffusion.

In some examples, some key metrics for evaluating the effectiveness of direct air contact (DAC) adsorbents include the carbon dioxide ($CO_2$) selectivity of the adsorbent in the presence of other gas compounds, carbon dioxide ($CO_2$) working capacity of the adsorbent during adsorption-desorption cycling, adsorption and desorption kinetics, energy required for the cycle or regenerative adsorption, chemical stability, mechanical stress robustness of the adsorbent during long-term cycling, and performance over a wide range of temperatures and humidity levels.

In some examples, polyamine-impregnated ordered mesoporous silica is still the most promising direct air contact (DAC) adsorbent, with a good balance between capture performance and cost. The concept of "mixed polyamines", which has been successfully adopted in amine solvent systems, may be attractive to further enhance the amine efficiencies. While amine loading is considered to be the main factor determining the carbon dioxide ($CO_2$) adsorption capacity of direct air contact (DAC) adsorbents, the textural characteristics and surface microstructure of the support also significantly affect the overall carbon dioxide ($CO_2$) capture efficiency.

Prototypical polyamines degrade oxidatively at elevated temperatures. Therefore, preventing oxidative degradation is a consideration. In some examples, Tetraethylenepentamine (TEPA)-loaded adsorbents that anchored polyethylenimine (PEI) have exhibited very high carbon dioxide ($CO_2$) adsorption capacities at various operating temperatures.

In some embodiments, the design of the contactors 50, e.g., gas-solid type contactors) is optimized to provide ultra-low pressure drops and enhanced heat and mass transfer. Further, adsorbents should be selected to remove both carbon dioxide ($CO_2$) and water vapor ($H_2O$). As many adsorbents are also effective in adsorbing water vapor and contaminants, future research should focus on developing adsorption systems that can remove both carbon dioxide ($CO_2$) and water vapor ($H_2O$). This can be realized by exploiting suitable adsorbents that can simultaneously remove carbon dioxide ($CO_2$) and water vapor ($H_2O$) and regenerate them at a similar energy consumption.

In some embodiments, the systems described herein can include aerosol injection into the chimney 10 configured for updraft applications. In some examples, direct air capture (DAC) of carbon dioxide ($CO_2$) can initially help to compensate for remaining carbon dioxide ($CO_2$) emissions and, when scaled to sufficient size, reverse the accumulating amount of carbon dioxide ($CO_2$) in the atmosphere. In some embodiments, the structures described herein can temporarily reduce global warming by stratospheric injection of aerosols. Large sloped solar updraft towers as described herein employing stratospheric injection of aerosols can create a hot air plume, which is fast enough and consistent enough, in particular when the exiting stream rotates to reach the stratosphere. Stratospheric aerosol injection (SAI), a type of solar radiation modification (SRM), has the potential to temporarily reduce global warming caused by excessive greenhouse gases in the atmosphere. In some examples, various forms of sulfur may be employed as the injected substance, as this is in part how volcanic eruptions cool the planet. Precursor gases such as sulfur dioxide and hydrogen sulfide have been considered.

The systems illustrated in FIGS. 1-5 can also improve the climate when compared to similar systems. This is accomplished by injecting aerosols into the rising air flow. Due to the high chimney 10 and the fast direct flow exiting the chimney 10, the system can inject aerosols to higher layers of the atmosphere, potentially into the stratosphere. It is understood that removal of the water can increase the density of the gas mixture exiting the tower. To improve the stratospheric injection, it can be advantageous to reduce water removal during those times where injection altitude should be maximized using gas plumes with lower densities that maintain a higher temperature during adiabatic expansion due to condensing water as observed in rising airflows that precede thunderstorms.

In yet another embodiment, the method and structures described herein can combine carbon dioxide ($CO_2$) removal with removal of methane ($CH_4$) and nitrous oxide ($NO_2$). Methane and nitrous oxide are present in the atmosphere at much lower concentrations of 1.909 and 0.334 ppm, but they can be 86 to 250 times stronger in greenhouse gases than carbon dioxide ($CO_2$) and thus contribute with 11.5% and 6.2% to global warming.

For this reason, it makes sense that the large volumes of air handled in sloped solar updraft tower and power plant (SSUPP) are also stripped from the second and third most significant greenhouse gases and one of the main gasses potentially causing the destruction of the ozone layer.

These two gasses (methane ($CH_4$) and nitrous oxide ($NO_2$) are partially co-adsorbed with carbon dioxide ($CO_2$) and water ($H_2O$) during the first sorption stage and thus ~30-100 fold enriched due to the removal of most nitrogen in this stage. These gasses are further enriched in the condensation stage with the removal of most water. This results in concentrations in the range 1 ppt or 0.1% within the 90% nitrogen and 10% carbon dioxide that leave the condenser stage in the gasometer. Expected recoveries will not be close to 100% but should exceed 75% with the given selectivity.

These gases then enter the second sorption column depicted in FIG. 5 where they preferentially pass the column together with the remaining nitrogen without being further concentrated. For this reason, to process these gasses a third column is needed having a different adsorbent like zeolite 5A where they are preferentially adsorbed while the nitrogen passes the column. With the regeneration process these gases are then concentrated to 10% and are ready to be subjected to further processing.

In some examples, oxidation under UV or with ozone would be a good way that results in carbon dioxide and water for methane and nitrogen and oxygen for nitrous oxide reducing the amount of global warming contributing gasses. In some embodiments, the combination of carbon dioxide ($CO_2$) capture and processing of methane ($CH_4$) and nitrous oxide ($N_2O$) increases the economic and ecological impact of an SSUP plant by an additional 20-30%.

Since carbon dioxide ($CO_2$) is captured on Zeolites that are catalytically active, the carbon dioxide ($CO_2$) capture process can be combined with a catalytic conversion of methane to carbon dioxide ($CO_2$) in presence of atmospheric oxygen and ultra-violet (UV) activation.

In some embodiments, some advantages of the present invention can include contactor 50 optimized for an ultra-low pressure drops so that the SSUP airflow is not limited. By not limiting airflow, the SUPP can produce more energy from the updraft. In some embodiments, an advantage can include the contactor 50 to applied to the airflow in the SSUP for combined sorption of carbon dioxide ($CO_2$) and water ($H_2O$) followed by separation in a gasometer 70. Additionally, the two-stage concentration in first contactor 50 followed by concentration to 100% in a sport source rapid thermal swing adsorption system 80 is another capture system provided herein.

Stratospheric aerosol injection using rotating effluent from the SSUP tower can provide a reduction in greenhouse gases. Additionally, catalytic breakdown under UV of other greenhouse gasses (methane, nitrous oxide) in conversion to carbon dioxide ($CO_2$) is another mechanism by which the structures provided here can capture carbon dioxide ($CO_2$) and other greenhouse gases.

In some embodiments, the sorbent material of the contactor 50 may be amine modified. It is noted that this is only one example of the present invention. The following description is provided for illustrative purposes only, and it is not intended that the contactor 50 be limited to only amine modified sorbent materials, or be limited to the following examples.

For amine-modified solid sorbents three preparation methods may be employed for integrating the solid sorbent into the contactor 50. The three preparation methods include class 1 sorbents, class 2 sorbents and class 3 sorbents. Class 1 sorbents are prepared by physically impregnating amines, but amines with low molecular weights leach during sorption and regeneration. Class 2 sorbents are prepared by chemically grafting the amines, thereby stabilizing the sorbent during regeneration. Class 1 sorbents have a higher capacity than Class 2 sorbents because of their higher amine content. Class 3 sorbents consist of a chemically grafted polyamine component that is prepared through in situ polymerization of amine-containing monomers. Using aziridine to obtain hyperbranched aminosilica (HAS) materials resulted in high loadings of stable amine functional groups.

Class 1 sorbents perform well for low viscosity primary and secondary amines, but the weak physical interactions degrade in humid conditions through water condensation and solubilization. Even under dry conditions monoethanolamine (MEA), diethanolamine (DEA), and diisopropanolamine (DIPA) are instable, because of their low boiling points and high volatility. Amines with large molecular weights are less volatile but the large molecular weight negatively affects the performance.

Class 2 sorbents are more stable due to the chemically grafted amines. Two approaches can be used to employ class 2 sorbents in the contactors depicted in FIGS. 1-5. A first approach includes siloxane groups of amine-containing silanes first being hydrolyzed and then bound to active hydroxy groups as they condense on the pore surfaces to produce a single layer of amine groups: 3-aminopropyltrimethoxysilane-(AP), 3-(2-aminoethyl)aminopropyltrimethoxy-silane (DAP), and 3-[2-(2-aminoethyl)aminoethyl]aminopropyltrimethoxysilane (TAP). React with a porous material. A second approach employs coupling agents to bind to the porous material on one side of the contactor and to the amine-bearing compound on the other. They are grafted onto the surface of porous materials and then amines are bound to them.

Class 3 hyperbranched aminosilica (HAS) supported amine sorbents have a higher working capacity because of the larger number of amines, and the excellent regeneration ability as a consequence of the covalent amine tethering. The sorption capacities increase from 0.2 mmol/g to 1.5 mmol/g with an increase in the amine loading from 2.2 mmolN/g to 10.0 mmolN/g for 400 ppm carbon dioxide ($CO_2$). Class 3 sorbents are easy to make, cost-effective, and stable over multiple cycles. A polybrush-mesoporous silica hybrid, was prepared by i) grafting 3-aminopropyltrimethoxysilane (APTMS) to the surface of SBA-15 mesoporous silica; ii) in situ ring-opening polymerization of Z-1-lysine NCA; and iii) cleavage of the Z-protecting group followed by neutralization with aqueous NaOH solution. The carbon dioxide ($CO_2$) uptake capacity was 0.6 mmol $CO_2$/g. The sorbent was robust during short regeneration tests.

There are also hybrids between class 1 and 2 materials in which a porous silica support is both impregnated with polyethylenimine (PEI) and also grafted with (3-aminopropyl)triethoxysilane (APTES).

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of carbon dioxide captures systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A solar updraft system, comprising:
- a chimney;
- a turbine installed at a lower part of the chimney;
- a solar collector feeding into the lower part of the chimney;
- a plurality of thermal storage pillars inside the solar collector; and
- a contactor, to an opening of the solar collector, having a plurality of fins including sorbent material, wherein the sorbent material absorbs carbon dioxide ($CO_2$) and water ($H_2O$), and the sorbent material includes pores that are vertically aligned to a plane of the plurality of fins.

2. The solar updraft system of claim 1, wherein the sorbent material adsorbs trace gasses selected from the group consisting of methane ($CH_4$), nitrous oxide ($N_2O$), and combinations.

3. The solar updraft system of claim 1, wherein the contactor is a component of a two stage system to adsorb the carbon dioxide ($CO_2$) and the water ($H_2O$), wherein a first stage of the two stage system includes the contactor, and a second stage of the two stage system includes a rapid temperature swing adsorption (RTSA) spot source capture system.

4. The solar updraft system of claim 3, further comprises a gasometer between the contactor of the first stage and the RTSA spot source capture system of the second stage.

5. The solar updraft system of claim 1, wherein the solar updraft system provides the carbon dioxide ($CO_2$) and the water ($H_2O$) without an external energy input.

6. The solar updraft system of claim 1, wherein the solar updraft system is a sloped solar updraft system.

7. The solar updraft system of claim 1, wherein the contactor includes a channel housing the plurality of aluminum fins on copper tubes, wherein the plurality of fins is coated with a layer of the sorbent material, and the plurality of fins are aluminum fins.

8. The solar updraft system of claim 1, wherein the contactor provides direct air capture (DAC) of the carbon dioxide ($CO_2$).

9. The solar updraft system of claim 1 further comprising injection of aerosol into the chimney, wherein the injection of the aerosol produces a rotating airflow plume to reach stratosphere.

10. The solar updraft system of claim 1, wherein the pores, that are vertically aligned to the plane of the plurality of fins, are selective towards the carbon dioxide ($CO_2$).

11. A solar updraft system, comprising:
- a chimney;
- a turbine installed at a lower part of the chimney;
- a solar collector feeding into the lower part of the chimney;
- a plurality of thermal storage pillars inside the solar collector; and
- a two stage system for absorbing carbon dioxide ($CO_2$) and water ($H_2O$) at an opening of the solar collector, a first stage of the two stage system including a contactor of a plurality of fins having a sorbent material for adsorbing the carbon dioxide ($CO_2$), and a second stage of the two stage system including a rapid temperature swing adsorption (RTSA) spot source capture system, wherein the sorbent material includes pores that are vertically aligned to a plane of the plurality of fins.

12. The solar updraft system of claim 11, wherein the sorbent material adsorbs trace gasses selected from the group consisting of methane ($CH_4$), nitrous oxide ($N_2O$), and combinations.

13. The solar updraft system of claim 11, further comprises a gasometer between the contactor of the first stage and the RTSA spot source capture system of the second stage.

14. The solar updraft system of claim 11, wherein the solar updraft system provides the carbon dioxide ($CO_2$) and the water ($H_2O$) without external energy input.

15. The solar updraft system of claim 11, wherein the solar updraft system is a sloped solar updraft system.

16. The solar updraft system of claim 11, wherein the contactor includes a channel housing the plurality of fins on copper tubes, wherein the plurality of fins is coated with a layer of the sorbent material, and the plurality of fins are aluminum fins.

17. The solar updraft system of claim 11, wherein the contactor provides direct air capture (DAC) of the carbon dioxide ($CO_2$).

18. The solar updraft system of claim 11 further comprising injection of aerosol into the chimney, wherein the injection of the aerosol produces a rotating airflow plume to reach stratosphere.

19. The solar updraft system of claim 11, wherein the pores, that are vertically aligned to the plane of the plurality of fins, are selective towards the carbon dioxide ($CO_2$).

20. A sloped solar updraft system, comprising:
- a chimney;
- a turbine installed at a lower part of the chimney;
- a solar collector feeding into the lower part of the chimney, wherein the solar collector is built into a geographic feature;
- a plurality of thermal storage pillars inside the solar collector; and
- a two stage system for absorbing the carbon dioxide ($CO_2$) and water ($H_2O$) at an opening of the solar collector, a first stage of the two stage system including a contactor of a plurality of fins having a sorbent material for adsorbing the carbon dioxide ($CO_2$), and a second stage of the two stage system including a rapid temperature swing adsorption (RTSA) spot source capture system, wherein the sorbent material includes pores that are vertically aligned to a plane of the plurality of fins.

* * * * *